(12) United States Patent
Chen et al.

(10) Patent No.: US 11,455,830 B2
(45) Date of Patent: Sep. 27, 2022

(54) FACE RECOGNITION METHOD AND APPARATUS, ELECTRONIC DEVICE, AND STORAGE MEDIUM

(71) Applicant: SHENZHEN SENSETIME TECHNOLOGY CO., LTD., Shenzhen (CN)

(72) Inventors: Zhenghao Chen, Shenzhen (CN); Jing Xu, Shenzhen (CN); Rui Zhao, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 239 days.

(21) Appl. No.: 16/907,406

(22) Filed: Jun. 22, 2020

(65) Prior Publication Data
US 2020/0320281 A1 Oct. 8, 2020

Related U.S. Application Data

(63) Continuation of application No. PCT/CN2019/100859, filed on Aug. 15, 2019.

(30) Foreign Application Priority Data

Feb. 2, 2019 (CN) .................. 201910107458.X

(51) Int. Cl.
G06V 40/16 (2022.01)
(52) U.S. Cl.
CPC .......... G06V 40/171 (2022.01); G06V 40/161 (2022.01); G06V 40/169 (2022.01); G06V 40/172 (2022.01)
(58) Field of Classification Search
CPC .. G06V 40/171; G06V 40/161; G06V 40/169; G06V 40/172; G06V 10/82;
(Continued)

(56) References Cited

U.S. PATENT DOCUMENTS

2012/0313964 A1 12/2012 Sato
2017/0032601 A1* 2/2017 Zhou .................. G07C 9/37
(Continued)

FOREIGN PATENT DOCUMENTS

CN 105678304 A 6/2016
CN 106611421 A 5/2017
(Continued)

OTHER PUBLICATIONS

"A Survey on Fine-Grained image Categorization Using Deep Convolutional Features", Aug. 2017; Jian-Hao Luo and Jan-Win Wu; Acta Automatica Sinica, vol. 43, No. (8), 13 pgs.
(Continued)

Primary Examiner — Md K Talukder
(74) Attorney, Agent, or Firm — Cooper Legal Group, LLC

(57) ABSTRACT

A face recognition method and apparatus, and a storage medium are provided. The method includes: performing attribute feature extraction on an image to be processed including a target object to obtain N attribute features of the target object, N being an integer greater than 1; performing attention feature extraction on the image to be processed based on an attention mechanism to obtain N attention features of the target object; clustering the N attention features to obtain M clustered attention features, M being a positive integer and M<N; and determining the face recognition result of the target object according to the N attribute features and the M clustered attention features.

20 Claims, 4 Drawing Sheets

(58) Field of Classification Search
CPC .. G06V 40/168; G06K 9/6267; G06K 9/6224; G06N 3/04
See application file for complete search history.

(56) References Cited

U.S. PATENT DOCUMENTS

| | | | |
|---|---|---|---|
| 2017/0286845 | A1 | 10/2017 | Gifford et al. |
| 2021/0326656 | A1* | 10/2021 | Lee ............... G06K 9/6262 |

FOREIGN PATENT DOCUMENTS

| | | | | |
|---|---|---|---|---|
| CN | 106845421 | A | | 6/2017 |
| CN | 107909059 | A | * | 4/2018 |
| CN | 107909059 | A | | 4/2018 |
| CN | 108229674 | A | | 6/2018 |
| CN | 108875521 | A | * | 11/2018 ......... G06K 9/00228 |
| CN | 108875521 | A | | 11/2018 |
| CN | 108960331 | A | | 12/2018 |
| CN | 109145867 | A | | 1/2019 |
| CN | 109255369 | A | | 1/2019 |
| CN | 109800737 | A | | 5/2019 |
| JP | 2003346151 | A | | 12/2003 |
| JP | 2017157138 | A | | 9/2017 |
| TW | I528331 | B | | 4/2016 |

OTHER PUBLICATIONS

International Search Report in the international application No. PCT/CN2019/100859, dated Oct. 29, 2019, 3 pgs.
First Office Action of the Chinese application No. 201910107458.X, dated Jun. 3, 2020, 18 pgs.
First Office Action of the Japanese application No. 2020-533112, dated Sep. 1, 2021, 3 pgs.
"Research on Attention Based image Classification with Deep Learning", Jan. 15, 2019; Peisen Wang; China Excellent Master's Thesis Fuii-text Database Information Technology Series No. 01, 83 pgs.
"Research on Food Image Classification Based on Deep Learning"; Sep. 15, 2018; Yali Chen; China Excellent Master's Thesis Full-text. Database Information Technology Series No. 09, 73 pgs.
"Look Closer to See Better: Recurrent Attention Convolutional Neural Network for Fine-grained Image Recognition", Jul. 26, 2019; Jianlong Fu, Heliang Zhen and Tao Mei; 2017 IEEE Conference on Computer Vision and pattern recognition, 9 pgs.

* cited by examiner

FACE RECOGNITION METHOD AND APPARATUS, ELECTRONIC DEVICE, AND STORAGE MEDIUM

CROSS REFERENCE TO RELATED APPLICATIONS

The present application is a continuation of International Patent Application No. PCT/CN2019/100859, filed on Aug. 15, 2019, which claims priority to Chinese Patent Application No. 201910107458.X, filed on Feb. 2, 2019. The disclosures of International Patent Application No. PCT/CN2019/100859 and Chinese Patent Application No. 201910107458.X are hereby incorporated by reference in their entireties.

BACKGROUND

Face attribute prediction is widely used, for example, it is an extremely important part in the field of monitoring and security protection. Effectively predicting the gender and age of a person, whether a dangerous article is worn and other attributes plays an extremely important role in the application of the face attribute prediction. Correct attribute prediction can further improve the accuracy of face recognition, so that the face recognition can be widely applied to various application scenarios.

SUMMARY

The present disclosure relates to, but is not limited to, the technical field of computers, and in particular, to a face recognition method and apparatus, an electronic device, and a storage medium.

The present disclosure provides a face recognition technical solution.

According to an aspect of the present disclosure, provided is a face recognition method, including: performing attribute feature extraction on an image to be processed including a target object to obtain N attribute features of the target object, N being an integer greater than 1; performing attention feature extraction on the image to be processed based on an attention mechanism to obtain N attention features of the target object; clustering the N attention features to obtain M clustered attention features, M being a positive integer and M<N; and determining the face recognition result of the target object according to the N attribute features and the M clustered attention features.

According to another aspect of the present disclosure, provided is a face recognition apparatus, including: an attribute extraction module, configured to perform attribute feature extraction on an image to be processed including a target object to obtain N attribute features of the target object, N being an integer greater than 1; an attention extraction module, configured to perform attention feature extraction on the image to be processed based on an attention mechanism to obtain N attention features of the target object; a clustering module, configured to cluster the N attention features to obtain M clustered attention features, M being a positive integer and M<N; a result determination module, configured to determine the face recognition result of the target object according to the N attribute features and the M clustered attention features.

According to another aspect of the present disclosure, provided is an electronic device, including: a processor; and a memory configured to store processor-executable instructions, where the processor is configured to execute the steps in the abovementioned method.

According to another aspect of the present disclosure, provided is a computer-readable storage medium, having computer program instructions stored thereon, where the computer program instructions, when being executed by a processor, enable the processor to implement the steps in the abovementioned method.

According to yet another aspect of the present disclosure, a computer program product, where the computer program product, when being executed by a processor, enables the processor to implement the steps in the abovementioned method.

Through the embodiments of the present disclosure, attribute feature extraction and attention feature extraction can be respectively performed on an image to be processed to obtain multiple attribute features and attention features; the attention features are clustered to obtain the clustered attention features, and the face recognition result is determined according to the multiple attribute features and the clustered attention features; the attention features are extracted by means of a multi-attention mechanism and similar attention features are clustered by clustering, so as to optimize different local features and improve the recognition effect of face attributes.

BRIEF DESCRIPTION OF THE DRAWINGS

The accompanying drawings, which are incorporated in and constitute a part of this specification, illustrate embodiments consistent with the present disclosure and, together with the specification, serve to explain the technical solutions of the present disclosure.

DETAILED DESCRIPTION

Figure 1:
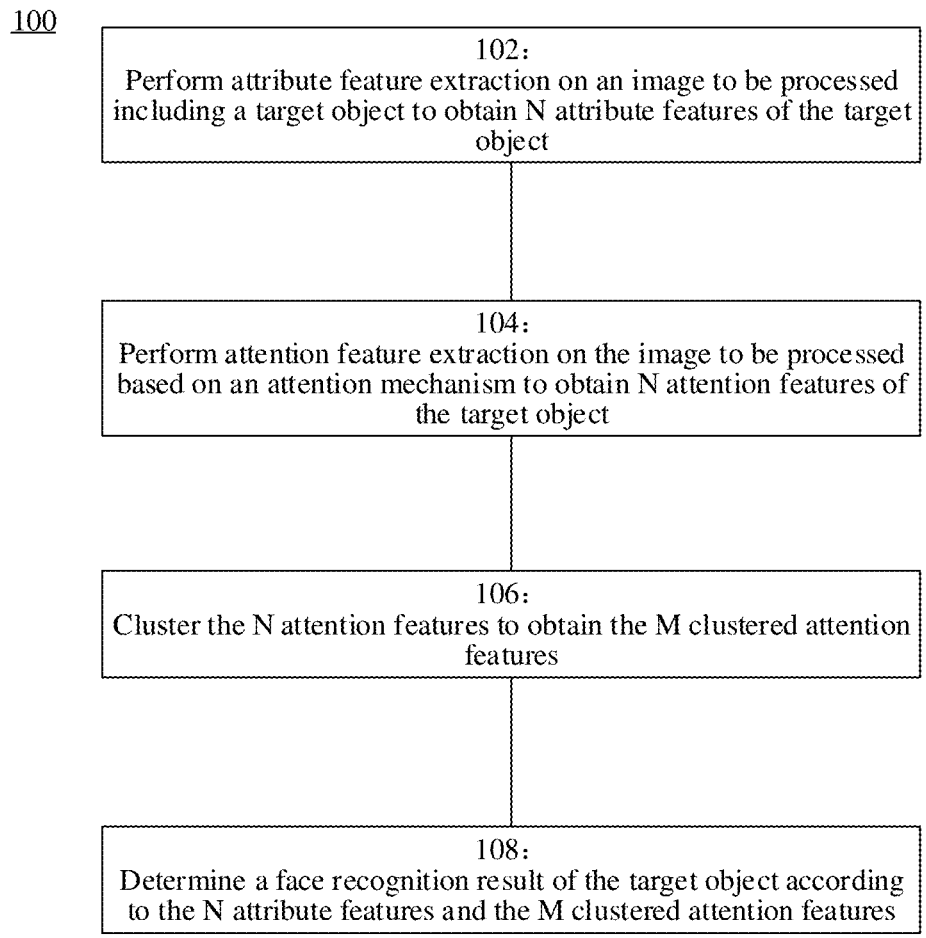
FIG. 1 is a flowchart illustrating a face recognition method according to embodiments of the present disclosure.

Various exemplary embodiments, features, and aspects of the present disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" as used herein only describes an association relation between associated objects, indicating that three relations may exist, for example, A and/or B may indicate three conditions, i.e., A exists separately, A and B exist at the same time, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included.

In addition, numerous details are given in the following detailed description for the purpose of better explaining the present disclosure. It should be understood by a person skilled in the art that the present disclosure can still be implemented even without some of those details. In some examples, methods, means, elements, and circuits that are well known to a person skilled in the art are not described in detail so that the principle of the present disclosure becomes apparent.

FIG. 1 is a flowchart illustrating a face recognition method 100 according to embodiments of the present disclosure. The face recognition method 100 includes the following steps. At step 102, attribute feature extraction is performed on an image to be processed including a target object to obtain N attribute features of the target object, and N is an integer greater than 1. At step 104, attention feature extraction is performed on the image to be processed based on an attention mechanism to obtain N attention features of the target object. At step 106, the N attention features are clustered to obtain M clustered attention features, M is a positive integer and M<N. At step 108, the face recognition result of the target object is determined according to the N attribute features and the M clustered attention features.

The method provided in the embodiments of the present disclosure can be applied to various image processing devices, and the image processing devices can recognize the face of a target object of an image, for example, human face recognition, by means of the executions of step 102, step 104, step 106, and step 108. The image processing device may be a security device, for example, a device mounted at positions such as a community door, a school, a factory, a residence where monitors are required to be mounted.

In some embodiments, the image processing device further may be applied to the field of non-security, for example, the image processing device may be a ticketing device that checks tickets by means of face recognition. For another example, the image processing device may be a payment device, and whether payment and the like are performed is determined by means of the face recognition result.

In conclusion, the face recognition method of the present disclosure is applied to various scenarios in which the face recognition is required to be performed to obtain the face recognition result.

According to the embodiments of the present disclosure, the attribute feature extraction and the attention feature extraction can be respectively performed on the image to be processed to obtain multiple attribute features and attention features; the attention features are clustered to obtain the clustered attention features, and the face recognition result is determined according to the multiple attribute features and the clustered attention features; the attention features are extracted by means of the multi-attention mechanism and similar attention features are clustered by clustering, so as to optimize different local features and improve the recognition effect of the face attributes.

In the process of face recognition (for example, the human face recognition), the features required for different tasks may not be the features of the whole face, but only the local features of the face. For example, if whether a person wears glasses is predicted, individual eye information may only be required, while redundant information may interfere with the result. Therefore, attention features are added to improve the precision of prediction.

In the embodiments of the present disclosure, the attention features may be the features that are specified to be required to be extracted, and may be one or more of the attribute features.

The attribute features may be the overall feature and/or local features of the target object. For example, the overall features include, but are not limited to, the overall features of the face of the target object; the local features may be a certain local feature in the face, for example, an eye feature, a lip feature and the like.

When the face attributes (for example, multiple attributes such as the gender and the age of a person and wearable objects related to the face) are recognized, multiple attributes can be recognized together and the features can be shared. In individual attributes, the attention mechanism can be added to enable important features (for example, the ears, the mouth, and the nose) to be better learned, that is, the local features can be emphasized, so as to better learn the overall attribute features.

In a possible implementation, the attribute feature extraction is performed on the image to be processed including the target object in step 102 to obtain the N attribute features of the target object. The target object may be, for example, a person in an image, and the image to be processed may be, for example, a human face image including the target object. The feature extraction is performed on the image to be processed by using, for example, a Convolution Neural Net (CNN) as a base net to obtain a face feature map; then the attribute feature extraction is performed on the obtained face feature map by means of, for example, a Multi-Task Convolution Neural Net (MTCNN) so as to obtain N attribute features of the target object. Different types of networks such as VGG16 and a residual network may be used in the MTCNN, and the network type of the MTCNN is not limited in the present disclosure.

In a possible implementation, the attention feature extraction is performed on the image to be processed based on the attention mechanism in step 104 to obtain the N attention features of the target object. The feature extraction is performed on the image to be processed by means of, for example, the base net to obtain the face feature map, so as to achieve feature sharing; and then the extraction of attention features is performed on the face feature map by means of the multiple IANs. It should be noted that each network in the multiple IANs is intended to train one individual attention point, for example, respectively for the glasses and the lip of the person. Regarding the IAN. A simple CNN can be used in the multiple IANs, or the attention mechanism of a related technique is adopted, for example, the residual attention, and the network type of the multiple IANs is not limited in the present disclosure.

In a possible implementation, the N attention features are clustered to obtain M clustered attention features in step 106.

For example, some face features can be better learned, for example, the glasses and the nose. Relatively, some fine-grained features such as earrings and eyebrows are not easy to be learned. Therefore, similar portions in all the attention features can be clustered together in a clustering manner and optimized, and especially some of the original attention features that are poor in learning effects are corrected.

In a possible implementation, step 106 includes the following steps.

The N attention features are clustered to obtain M cluster sets, and each of the N attention features corresponds to one cluster set in the M cluster sets.

A clustered attention feature of each of the M cluster sets are respectively determined to obtain the M clustered attention features.

For example, the N attention features are clustered to M classes (M<N), and after clustering, each attention feature corresponds to one class of the M classes. M cluster sets can be obtained after the clustering. The clustered attention features of the cluster sets are respectively extracted to obtain the M clustered attention features. In this way, the M clustered attention features can be used as representatives of N attention features, and accordingly the face recognition result of the target object is determined according to N attribute features and the M clustered attention features.

In a possible implementation, clustering may be the spectral clustering, and the M clustered attention features are cluster centers of the cluster sets of the M cluster sets. There are multiple methods for extracting the cluster centers from the M cluster sets. In an implementation, all the values can be averaged in each cluster set to obtain the cluster center. In another implementation, training can be performed by means of a preset training set to learn to obtain the corresponding weight of each attention feature, and a weighted average is performed on each attention feature in the cluster set to obtain the cluster center of the cluster combination. The present disclosure does not limit the specific manner of clustering.

In this way, the attention features that are easy to be learned can facilitate other attention features that are not easy to be learned, and the effect of the attention mechanism can be improved by means of the mutual help of related attention features.

In a possible implementation, at step 108, the face recognition result of the target object is determined according to the N attribute features and the M clustered attention features. The obtained N attribute features and M clustered attention features can be comprehensively considered in the manners of multiplication and the like, and further processing can also be performed in other manners to determine the face recognition result of the target object.

In a possible implementation, step 108 includes the following step.

The N attribute features are respectively corrected according to the M clustered attention features to obtain the face recognition result. That is to say, the N attribute features are respectively directly corrected by adopting the M clustered attention features.

In a possible implementation, the step of correcting the N attribute features according to the M clustered attention features includes the step. The N attribute features are respectively multiplied by the clustered attention features corresponding to at least some of the N attribute features to obtain the face recognition result.

In this way, the face recognition result can be better focused on a single attention feature. The at least some of the N attribute features in the embodiments include: the attribute features, which has the number of less than N, in the N attribute features.

In a possible implementation, the method further includes the following step. The N attribute features are respectively multiplied by the N attention features to obtain N enhanced attribute features.

Step 108 includes: the N enhanced attribute features are respectively corrected according to the M clustered attention features to obtain the face recognition result of the target object.

For example, the N attention features are firstly respectively multiplied by the N attribute features to obtain the N enhanced attribute features, and thus the attribute features that are required to be emphasized are enhanced. Furthermore, the N enhanced attribute features are respectively corrected according to the M clustered attention features to obtain the face recognition result of the target object.

In a specific implementation, the step of correcting the N enhanced attribute features according to the M clustered attention features includes the step. The N enhanced attribute features are respectively multiplied by the clustered attention features corresponding to at least some of the N attribute features to obtain the face recognition result.

In this way, the attention features can be further emphasized to improve the effect of face recognition.

In a possible implementation, the method further includes that the determined face recognition result of the target object is displayed on the electronic device, such as a terminal, a remote computer or a server.

Figure 2:
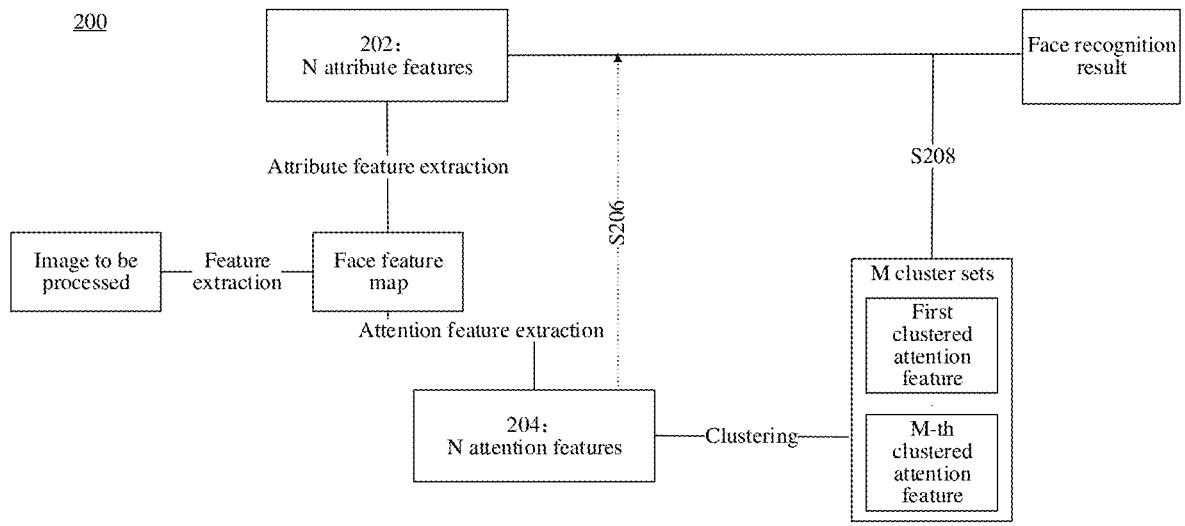
FIG. 2 is a schematic diagram illustrating an application example of a face recognition method according to embodiments of the present disclosure.

FIG. 2 is a schematic diagram illustrating an application example of a face recognition method according to embodiments of the present disclosure. Method 200 is an application example of face recognition method 100. As shown in FIG. 2, in method 200, the feature extraction is performed on the image to be processed by means of the base net to obtain the face feature map; the attribute feature extraction is performed on the face feature map to obtain N attribute features 202; the attention feature extraction is performed on the face feature map to obtain N attention features 204; the N attention features 204 are clustered to obtain M cluster sets. Each attention feature of the N attention features corresponds to one cluster set of the M cluster sets; a clustered attention feature of each of the M cluster sets are respectively determined to obtain the M clustered attention features.

In a variant of face recognition method 200, the N attribute features 202 are directly corrected according to the M clustered attention features obtained from the N attention features 204 (S208) to determine the face recognition result of the target object. In this case, the face recognition result of the target object is corrected by using the leading of IAN clustering, and the attention features that are not easy to be learned are optimized by means of the attention features that are easy to be learned.

In a variant of face recognition method 200, as shown in a dotted arrow S206 in FIG. 2, the N attention features 204 are further respectively multiplied by the N attribute features 202 to obtain the N enhanced attribute features. Accordingly, the N enhanced attribute features are respectively corrected according to the M clustered attention features to obtain the face recognition result of the target object. Hence, the attention features are further emphasized, and the attention features that are not easy to be learned are optimized by means of the attention features that are easy to be learned.

According to the variant of face recognition method 200, the attention mechanism can be improved by means of the mutual help of related attributes.

In a possible implementation, the method is implemented through the neural network; and the neural network includes the multi-task convolution network, a plurality of IANs, and the clustering network. The multi-task convolution network is configured to perform the attribute feature extraction on the image to be processed, the plurality of IANs are configured to perform the attention feature extraction on the image to be processed, and the clustering network is configured to cluster the N attention features.

The MTCNN is configured to extract the attribute features 202 of the image to be processed (the face feature map). Regarding the specifically used MTCNN, different sizes of networks such as the VGG16 and the residual network can be used for dealing with different application scenarios.

The multiple IANs are configured to extract the attention features 204 of the image to be processed (the face feature map). It should be noted that each network in the multiple IANs is intended to train one individual attention point, for example, respectively for the glasses and the lip of the person. Regarding IAN, the simple CNN can be used for learning, or the attention mechanism, for example, the residual attention is adopted.

The clustering network is configured to cluster the N attention features to obtain the M clustered attention features. The network types of the clustering networks are not limited in the present disclosure.

In a possible implementation, the method further includes the step. During training of the neural network, the network parameters of the multiple IANs are adjusted according to the network loss of the clustering network.

The neural networks can be trained according to the preset training set. In the networks adopted in the present invention, a combined task is adopted to optimize, and the link involved by manual operation is not involved in the process of combination, but the optimization is achieved by completely adopting independent learning.

In the process of training the neural network, the network parameters of the multiple IANs are adjusted according to the network loss of the clustering network, thereby optimizing the IAN by using back propagation of the neural network.

In a specific implementation, a multi-task attribute learning network based on the MTCNN can be used, and N attributes of the face feature map are trained to obtain the N attribute features 202. The N attribute features 202 by means of the MTCNN are feature tensors, which can be represented as (N, C, W, H). The numerical value of (N, C, W, H) is decided by a specific neural network. N, C, W, and H are natural numbers, N represents the number of the feature tensors; C represents the number of the obtained feature maps, is also called the number of channels, and is generally far greater than 3; W represents the width of the feature map; and H represents the length of the feature map. That is to say, the N attribute features 202 can be represented as N attribute features (C, W, H), i.e., N attribute feature tensors (the number of channels, the width, the length). The N attribute features 202 can be subsequently used for predicting N face attributes which are used as the face recognition result.

In a specific implementation, the N attributes from the face feature map can be trained by using, for example, the IAN, and the N attributes are learned by using an attention map so as to obtain the N attention features 204. Because each attention feature corresponds to one two-dimensional attention feature image (Mask), a feature tensor A of the obtained attention feature 204 can be represented as (N, 1, W, H), that is, the number of channels herein is 1. Therefore, the N attention features 204 can be represented as N feature tensors A (W, H), that is, N feature tensors A (the width, the length).

In a specific implementation, as exemplified by the dotted arrow S206 in FIG. 2, the N attention feature tensors A (the width, the length) can be multiplied by N attribute feature tensors, so that the related features in the N attribute feature tensors are emphasized.

In a specific implementation, the N attention features are clustered to obtain the M cluster sets, which can be represented as $C_1, \ldots, C_M$. The cluster centers respectively extracted from the M cluster sets can be represented as a first clustered attention feature $(A_{x1}, A_{y1}), \ldots,$ an M-th clustered attention feature $(A_{xm}, A_{ym})$. The M clustered attention features can be represented as (M, 1, W, H), that is, M two-dimensional tensors $X_{\_1}$ (the width, the length), $\ldots,$ $X_{\_M}$ (the width, the length). Cluster centers respectively corresponding to N attribute feature tensors F (the number of channels, the width, the length) obtained by correcting the N attention features A are determined, and then the N attribute features F are finally corrected by using corresponding cluster centers in the M two-dimensional tensors X. Because the M tensors X are from the output of the previous IAN, the IAN can also be optimized by means of the learning, and the N attribute features F can further be corrected by using multiple attention features.

In a specific example, the correcting approach is: multiplying the N attribute features F (the number of channels, the width, the length) by M clustered tensors $X_{\_m}$, where m is a natural number within the range of [1, M]. Hence, the multiplied tensor FX (M, the number of channels, the width, the length) is obtained. The multiplied tensor FX (M, the number of channels, the width, the length) is expanded into (M×the number of channels, the width, the length), the features are finally predicted by using the expanded result to obtain the final face recognition result.

Figure 3:
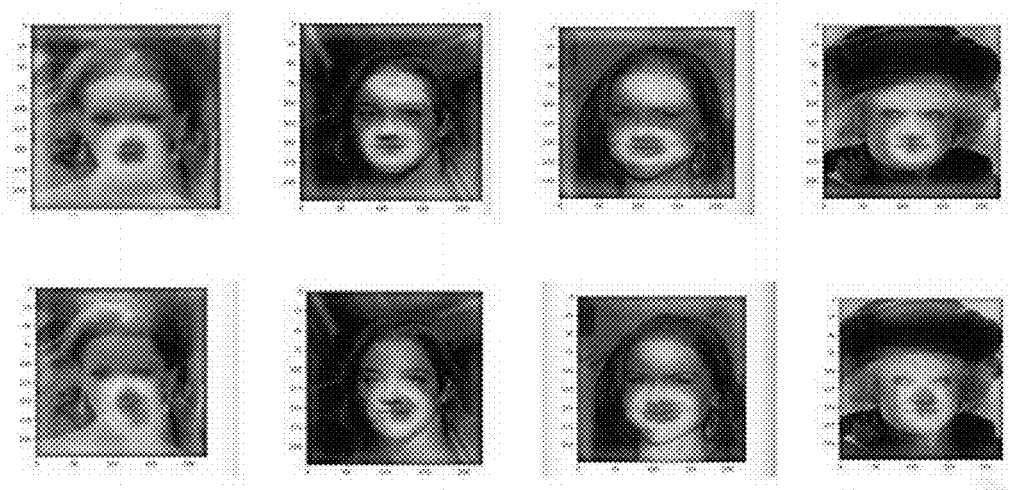
FIG. 3 is a comparison diagram illustrating lip attention features before and after the optimization according to the present disclosure.

According to the method, the face recognition effect of the attention features under multi-task can be wholly improved. FIG. 3 is a comparison diagram illustrating lip attention features before and after the optimization according to the present disclosure. As shown in the upper half part of FIG. 3, there is much noise in a lip attention feature image before the optimization. As shown in the lower half part of FIG. 3, the lip attention feature can be better concentrated on the lip after the optimization according to the present disclosure, and the noise is reduced.

According to the face recognition method of the embodiments of the present disclosure, the intensity of training a model is increased by means of autonomous optimization of the attention features when training and predicting the face attribute to improve the precision of prediction, so as to better predict a fine-grained attribute of the human face, for example, whether a hat and a necklace are worn, and whether a headset is worn. The embodiments according to the present disclosure can be applied to the field of monitoring and security and the like for human face attribute recognition, the human face attribute recognition rate is improved, and the recognition effect is improved.

It should be understood that the foregoing various method embodiments mentioned in the present disclosure may be combined with each other to form a combined embodiment without departing from the principle logic. Details are not described herein again due to space limitation.

In addition, the present disclosure further provides a face recognition apparatus, an electronic device, a computer-readable storage medium, and a program, which can all be used for implementing any one of face recognition methods provided in the present disclosure. For the corresponding technical solutions and descriptions, please refer to the corresponding content in the method section. Details are not described herein again.

A person skilled in the art can understand that, in the foregoing methods of the specific implementations, the order in which the steps are written does not imply a strict execution order, and the specific order of executing the steps should be determined by functions and possible internal logics thereof.

Figure 4:
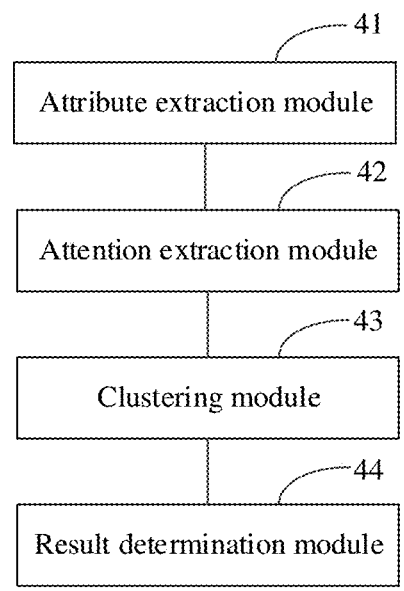
FIG. 4 is a block diagram of a face recognition apparatus according to embodiments of the present disclosure.

FIG. 4 is the block diagram illustrating the face recognition apparatus according to the embodiments of the present disclosure. As shown in FIG. 4, the apparatus includes:

an attribute extraction module 41, configured to perform attribute feature extraction on an image to be processed including a target object to obtain N attribute features of the target object, N being an integer greater than 1;

an attention extraction module 42, configured to perform attention feature extraction on the image to be processed based on an attention mechanism to obtain N attention features of the target object;

a clustering module 43, configured to cluster the N attention features to obtain M clustered attention features, M being a positive integer and M<N; and a result determination module 44, configured to determine the face recognition result of the target object according to the N attribute features and the M clustered attention features.

In a possible implementation, the clustering module includes: a clustering sub-module, configured to cluster the N attention features to obtain M cluster sets, each of the N attention features corresponding to one cluster set in the M cluster sets; a feature determination sub-module, configured to respectively determine a clustered attention feature of each of the M cluster sets to obtain the M clustered attention features.

In a possible implementation, the apparatus further includes: an attribute enhancement module, configured to multiply the N attribute features respectively by the N attention features to obtain the N enhanced attribute features, where the result determination module includes:

a first correction sub-module, configured to respectively correct the N enhanced attribute features according to the M clustered attention features to obtain the face recognition result of the target object.

In a possible implementation, the result determination module includes: a second correction sub-module, configured to respectively correct the N attribute features according to the M clustered attention features to obtain the face recognition result.

In a possible implementation, the first correction sub-module includes: a first multiplication sub-module, configured to multiply the N enhanced attribute features respectively by the clustered attention features corresponding to the attribute features to obtain the face recognition result.

In a possible implementation, the second correction sub-module includes: a second multiplication sub-module, configured to multiply the N attribute features respectively by the clustered attention features corresponding to the attribute features to obtain the face recognition result.

In a possible implementation, the apparatus is implemented by a neural network; and the neural network includes a multi-task convolution network, a plurality of IANs, and a clustering network. The multi-task convolution network is configured to perform the attribute feature extraction on the image to be processed, the plurality of IANs are configured to perform the attention feature extraction on the image to be processed, and the clustering network is configured to cluster the N attention features.

In a possible implementation, the apparatus further includes: a parameter adjustment module, configured to adjust network parameters of the multiple IANs according to the network loss of the clustering network during training of the neural network.

In a possible implementation, the clustering operation includes spectral clustering, and the M clustered attention features are respectively cluster centers of the M cluster sets.

In some embodiments, the functions provided by or the modules included in the apparatuses provided by the embodiments of the present disclosure may be used to implement the methods described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where the computer program instructions, when being executed by a processor, enable the processor to implement the steps of the abovementioned method. The computer-readable storage medium may be a non-volatile computer-readable storage medium.

The embodiments of the present disclosure further provide an electronic device, including: a processor; and a memory configured to store processor-executable instructions, where the processor is configured to implement the steps of the abovementioned method.

The electronic device may be provided as a terminal, a server, or other forms of devices.

The embodiments of the present disclosure further provide a computer program product, and the foregoing methods are implemented after the computer program product is executed by a processor.

Figure 5:
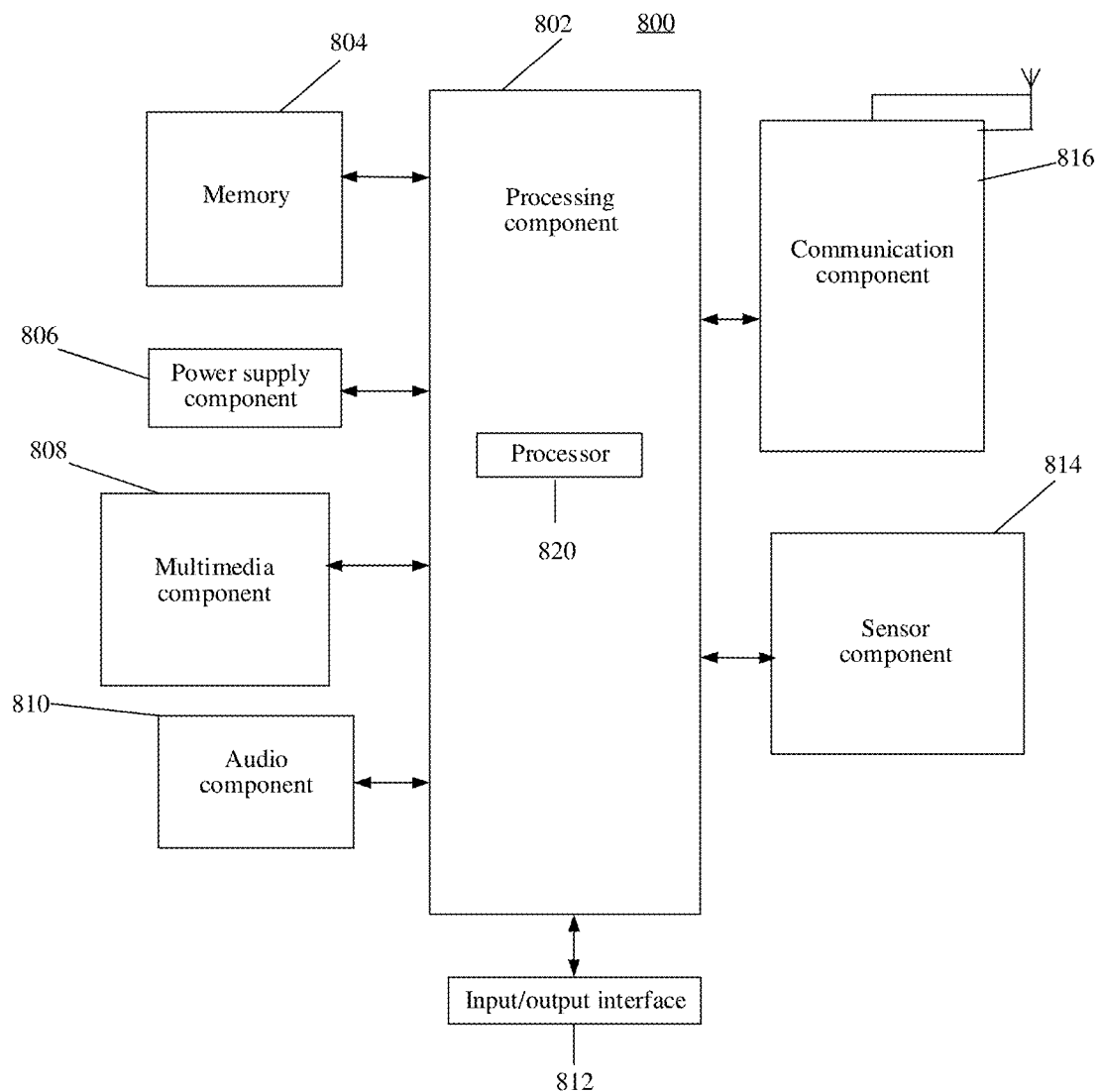
FIG. 5 is a block diagram illustrating an electronic device according to embodiments of the present disclosure.

FIG. 5 is a block diagram illustrating an electronic device 800 according to the embodiments of the present disclosure. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 5, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the method above.

Figure 6:
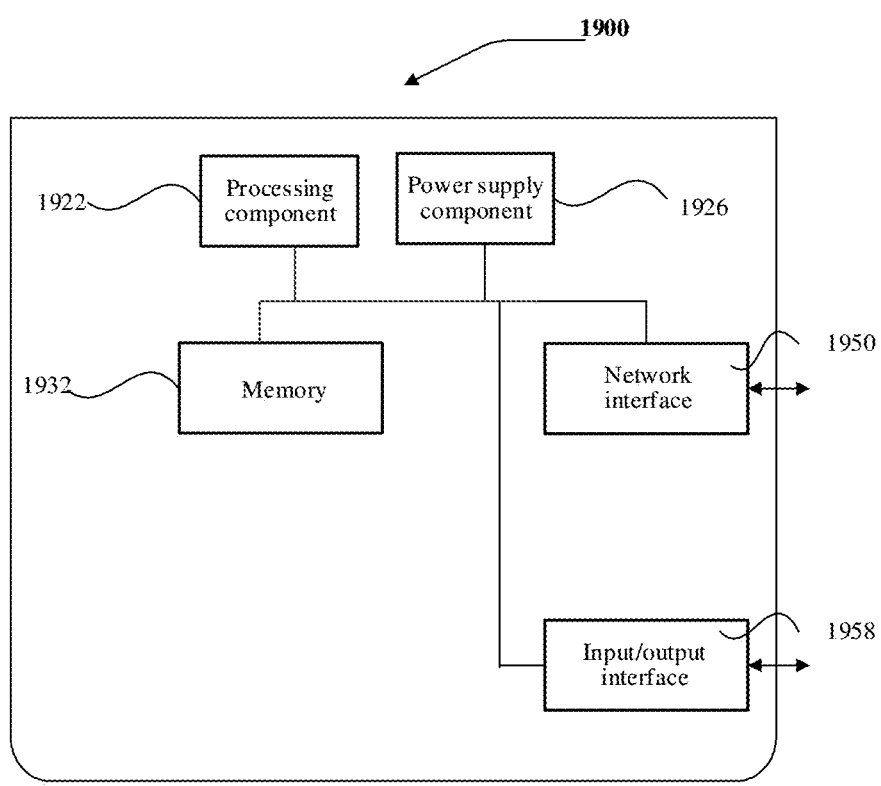
FIG. 6 is a block diagram illustrating an electronic device according to embodiments of the present disclosure.

FIG. 6 is a block diagram illustrating an electronic device 1900 according to embodiments of the present disclosure. For example, the electronic device 1900 may be provided as a server. With reference to FIG. 6, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Furthermore, the processing component 1922 is configured to execute instructions so as to execute the method above.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium having computer-readable program instructions thereon for enabling a processor to implement aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination thereof. A computer-readable storage medium, as used herein, is not to be construed as being transitory signals per se, such as radio waves or other freely propagating electromagnetic waves, electromagnetic waves propagating by means of a waveguide or other transmission media (e.g., light pulses passing through a fiber-optic cable), or electrical signals transmitted by means of a wire.

Computer-readable program instructions described herein can be downloaded to respective computing/processing devices from the computer-readable storage medium or to an external computer or external storage device by means of a network, for example, the Internet, a Local Area Network (LAN), a Wide Area Network (WAN) and/or a wireless network. The network may include copper transmission cables, optical fiber transmission, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer readable program instructions can be executed completely on a user computer, executed partially on the user computer, executed as an independent software package, executed partially on the user computer and partially on a remote computer, or executed completely on the remote computer or server. In a scenario involving a remote computer, the remote computer may be connected to the user computer by means of any type of network, including the LAN or the WAN, or the connection may be made to an external computer (for example, by means of the Internet using an Internet service provider). In some embodiments, electronic circuitry including, for example, programmable logic circuitry, the FGPAs, or Programmable Logic Arrays (PLAs) may execute the computer-readable program instructions by utilizing state information of the computer readable program instructions to personalize the electronic circuitry, so as to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by the computer-readable program instructions.

These computer-readable program instructions may be provided to a processor of a general-purpose computer, special-purpose computer, or other programmable data processing apparatus to produce a machine, such that the instructions, which execute by means of the processor of the computer or other programmable data processing apparatuses, create means for implementing the functions/actions specified in one block or multiple blocks in the flowchart and/or block diagram. These computer-readable program instructions may also be stored in the computer-readable storage medium, the instructions enable the computer, the programmable data processing apparatus, and/or other devices to function in a particular manner, so that the computer-readable medium having instructions stored therein includes an article of manufacture including instructions which implement the aspects of the functions/actions specified in one or more blocks of the flowcharts and/or block diagrams.

The computer-readable program instructions may also be loaded onto a computer, other programmable data processing apparatuses, or other devices to cause a series of operational steps to be performed on the computer, other programmable data processing apparatuses or other devices to produce a computer implemented process, so that the instructions which are executed on the computer, other programmable data processing apparatuses or other devices implement the functions/actions specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart or block diagram may represent a module, a program segment, or a portion of instruction, which includes one or more executable instructions for implementing the specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or actions or implemented by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. A face recognition method, comprising:
performing attribute feature extraction on an image to be processed comprising a target object to obtain N attribute features of the target object, N being an integer greater than 1;
performing attention feature extraction on the image to be processed based on an attention mechanism to obtain N attention features of the target object, wherein the attention features are features that are specified to be required to be extracted from the image to be processed, and the attention features are one or more of the attribute features;
clustering the N attention features to obtain M clustered attention features, M being a positive integer and M<N; and
determining a face recognition result of the target object according to the N attribute features and the M clustered attention features.

2. The method according to claim 1, wherein the clustering the N attention features to obtain the M clustered attention features comprises:
clustering the N attention features to obtain M cluster sets, each of the N attention features corresponding to one of the M cluster sets; and
respectively determining a clustered attention feature of each of the M cluster sets to obtain the M clustered attention features.

3. The method according to claim 1, further comprising:
multiplying the N attribute features respectively by the N attention features to obtain N enhanced attribute features,
wherein the determining the face recognition result of the target object according to the N attribute features and the M clustered attention features comprises:
respectively correcting the N enhanced attribute features according to the M clustered attention features to obtain the face recognition result of the target object.

4. The method according to claim 1, wherein the determining the face recognition result of the target object according to the N attribute features and the M clustered attention features comprises:
respectively correcting the N attribute features according to the M clustered attention features to obtain the face recognition result.

5. The method according to claim 3, wherein the respectively correcting the N enhanced attribute features according to the M clustered attention features to obtain the face recognition result of the target object comprises:
multiplying the N enhanced attribute features respectively by the clustered attention features corresponding to at least some of the N attribute features to obtain the face recognition result.

6. The method according to claim 4, wherein the respectively correcting the N attribute features according to the M clustered attention features to obtain the face recognition result of the target object comprises:
multiplying the N attribute features respectively by the clustered attention features corresponding to at least some of the N attribute features to obtain the face recognition result.

7. The method according to claim 1, implemented by a neural network comprising a multi-task convolution network, a plurality of individual attention networks, and a clustering network, wherein the multi-task convolution network is configured to perform the attribute feature extraction on the image to be processed, the plurality of individual attention networks are configured to perform the attention feature extraction on the image to be processed, and the clustering network is configured to cluster the N attention features.

8. The method according to claim 7, further comprising:
adjusting network parameters of the plurality of individual attention networks according to a network loss of the clustering network during training of the neural network.

9. The method according to claim 2, wherein the clustering comprises spectral clustering, and the M clustered attention features are respectively cluster centers of the M cluster sets.

10. The method according to claim 1, further comprising:
displaying the determined face recognition result of the target object on an electronic device.

11. An electronic device, comprising:
a processor; and
a memory, configured to store processor-executable instructions;
wherein the processor is configured to:
perform attribute feature extraction on an image to be processed comprising a target object to obtain N attribute features of the target object, N being an integer greater than 1;
perform attention feature extraction on the image to be processed based on an attention mechanism to obtain N attention features of the target object, wherein the attention features are features that are specified to be required to be extracted from the image to be processed, and the attention features are one or more of the attribute features;
cluster the N attention features to obtain M clustered attention features, M being a positive integer and M<N; and
determine a face recognition result of the target object according to the N attribute features and the M clustered attention features.

12. The electronic device according to claim 11, wherein the processor is configured to:
cluster the N attention features to obtain M cluster sets, each of the N attention features corresponding to one of the M cluster sets; and
respectively determine a clustered attention feature of each of the M cluster sets to obtain the M clustered attention features.

13. The electronic device according to claim 11, wherein the processor is configured to:
multiply the N attribute features respectively by the N attention features to obtain N enhanced attribute features; and
respectively correct the N enhanced attribute features according to the M clustered attention features to obtain the face recognition result of the target object.

14. The electronic device according to claim 11, wherein the processor is configured to:
respectively correct the N attribute features according to the M clustered attention features to obtain the face recognition result.

15. The electronic device according to claim 13, wherein the processor is configured to:
multiply the N enhanced attribute features respectively by the clustered attention features corresponding to at least some of the N attribute features to obtain the face recognition result.

16. The electronic device according to claim 14, wherein the processor is configured to:
  multiply the N attribute features respectively by the clustered attention features corresponding to at least some of the N attribute features to obtain the face recognition result.

17. The electronic device according to claim 11, implemented by a neural network comprising a multi-task convolution network, a plurality of individual attention networks, and a clustering network, wherein
  the multi-task convolution network is configured to perform the attribute feature extraction on the image to be processed, the plurality of individual attention networks are configured to perform the attention feature extraction on the image to be processed, and the clustering network is configured to cluster the N attention features.

18. The electronic device according to claim 17, wherein the processor is configured to:
  adjust network parameters of the plurality of individual attention networks according to a network loss of the clustering network during training of the neural network.

19. The electronic device according to claim 12, wherein the clustering comprises spectral clustering, and the M clustered attention features are respectively cluster centers of the M cluster sets.

20. A non-transitory computer-readable storage medium, having computer program instructions stored thereon, wherein the computer program instructions, when being executed by a processor, enable the processor to implement a face recognition method, the face recognition method comprising:
  performing attribute feature extraction on an image to be processed comprising a target object to obtain N attribute features of the target object, N being an integer greater than 1;
  performing attention feature extraction on the image to be processed based on an attention mechanism to obtain N attention features of the target object, wherein the attention features are features that are specified to be required to be extracted from the image to be processed, and the attention features are one or more of the attribute features;
  clustering the N attention features to obtain M clustered attention features, M being a positive integer and M<N; and
  determining a face recognition result of the target object according to the N attribute features and the M clustered attention features.

* * * * *